United States Patent
Vera et al.

(10) Patent No.: US 9,176,895 B2
(45) Date of Patent: Nov. 3, 2015

(54) INCREASED ERROR CORRECTION FOR CACHE MEMORIES THROUGH ADAPTIVE REPLACEMENT POLICIES

(71) Applicant: Intel Corporation, Santa Clara, CA (US)

(72) Inventors: Xavier Vera, Barcelona (ES); Javier Carretero Casado, Barcelona (ES); Enric Herrero Abellanas, Cardedeu (ES); Daniel Sanchez, L'Hospitalet de Llobregat (ES); Nicholas Axelos, Barcelona (ES); Tanausu Ramirez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 13/844,819

(22) Filed: Mar. 16, 2013

(65) Prior Publication Data

US 2014/0281261 A1 Sep. 18, 2014

(51) Int. Cl.
G06F 12/12 (2006.01)
G06F 12/08 (2006.01)
G06F 11/00 (2006.01)

(52) U.S. Cl.
CPC ............. *G06F 12/126* (2013.01); *G06F 11/00* (2013.01); *G06F 12/0895* (2013.01); *Y02B 60/1225* (2013.01)

(58) Field of Classification Search
None
See application file for complete search history.

(56) References Cited

U.S. PATENT DOCUMENTS

| | | |
|---|---|---|
| 5,673,422 A | 9/1997 | Kawai et al. |
| 5,675,773 A | 10/1997 | Devic |
| 6,480,975 B1 | 11/2002 | Arimilli et al. |
| 7,260,680 B2 | 8/2007 | Abe |
| 7,447,054 B2 | 11/2008 | Abella et al. |
| 7,558,992 B2 | 7/2009 | Ergin et al. |
| 7,577,015 B2 | 8/2009 | Abella et al. |
| 7,600,145 B2 | 10/2009 | Vera et al. |
| 7,689,804 B2 | 3/2010 | Vera et al. |
| 7,747,913 B2 | 6/2010 | Abella et al. |
| 8,069,376 B2 | 11/2011 | Monferrer et al. |
| 8,074,110 B2 | 12/2011 | Vera et al. |
| 8,090,996 B2 | 1/2012 | Vera et al. |
| 8,103,830 B2 | 1/2012 | Wilkerson et al. |
| 8,151,094 B2 | 4/2012 | Vera et al. |
| 8,291,168 B2 | 10/2012 | Wilkerson et al. |
| 8,397,130 B2 | 3/2013 | Clark et al. |
| 8,463,825 B1 * | 6/2013 | Harty et al. ............ 711/100 |
| 2003/0120962 A1 | 6/2003 | Dai et al. |
| 2003/0131277 A1 | 7/2003 | Taylor et al. |
| 2003/0212865 A1 * | 11/2003 | Hicken et al. .......... 711/135 |

(Continued)

OTHER PUBLICATIONS

IBM, Double Word Change Recording, IBM technical disclosure bulletin, Apr. 1, 1992, vol. 34 issue 11 pp. 154-155.*

(Continued)

*Primary Examiner* — Aimee Li
*Assistant Examiner* — Jason Blust
(74) *Attorney, Agent, or Firm* — Trop, Pruner & Hu, P.C.

(57) ABSTRACT

A system, processor and method to reduce the overall detectable unrecoverable FIT rate of a cache by reducing the residency time of dirty lines in a cache. This is accomplished through selectively choosing different replacement policies during execution based on the DUE FIT target of the system. System performance and power is minimally affected while effectively reducing the DUE FIT rate.

17 Claims, 7 Drawing Sheets

(56) References Cited

U.S. PATENT DOCUMENTS

| | | | |
|---|---|---|---|
| 2004/0117441 A1* | 6/2004 | Liu et al. | 711/135 |
| 2004/0151398 A1 | 8/2004 | Betrisey et al. | |
| 2005/0015555 A1* | 1/2005 | Wilkerson | 711/128 |
| 2005/0131995 A1 | 6/2005 | Chase et al. | |
| 2005/0132263 A1 | 6/2005 | Anderson et al. | |
| 2005/0149781 A1 | 7/2005 | Lempel et al. | |
| 2005/0188249 A1 | 8/2005 | Hart et al. | |
| 2005/0278486 A1* | 12/2005 | Trika et al. | 711/142 |
| 2006/0075186 A1 | 4/2006 | Abe | |
| 2006/0095806 A1 | 5/2006 | Dai | |
| 2006/0179346 A1 | 8/2006 | Bishop et al. | |
| 2006/0284883 A1 | 12/2006 | Jeong | |
| 2007/0044003 A1 | 2/2007 | Doweck et al. | |
| 2007/0113158 A1 | 5/2007 | Fischer et al. | |
| 2008/0016393 A1 | 1/2008 | Bose et al. | |
| 2008/0189489 A1 | 8/2008 | Mitra | |
| 2008/0222358 A1 | 9/2008 | Emma et al. | |
| 2008/0244186 A1 | 10/2008 | Bose et al. | |
| 2009/0100302 A1 | 4/2009 | Francis et al. | |
| 2009/0164870 A1 | 6/2009 | Penton et al. | |
| 2010/0199050 A1 | 8/2010 | Lafrese et al. | |
| 2010/0241932 A1 | 9/2010 | Sakaue et al. | |
| 2010/0269018 A1 | 10/2010 | Clark et al. | |
| 2011/0047408 A1 | 2/2011 | Gille et al. | |
| 2011/0320866 A1 | 12/2011 | Ambroladze et al. | |
| 2012/0117428 A1 | 5/2012 | Fukuda | |
| 2013/0297880 A1* | 11/2013 | Flynn | 711/128 |
| 2014/0019677 A1* | 1/2014 | Chang et al. | 711/105 |
| 2014/0189252 A1* | 7/2014 | Biswas | 711/142 |
| 2014/0195733 A1* | 7/2014 | Russell et al. | 711/114 |

OTHER PUBLICATIONS

Zhang (Computing and minimizing cache vulnerability to transient errors, Design & Test of Computers, IEEE, Volume:26, Issue: 2, pp. 44-51, Apr. 24, 2009).*

* cited by examiner

INCREASED ERROR CORRECTION FOR CACHE MEMORIES THROUGH ADAPTIVE REPLACEMENT POLICIES

TECHNICAL FIELD

Embodiments described herein generally relate to reduction of the overall detectable unrecoverable FIT rate of a cache in microprocessor-based systems.

BACKGROUND

As cache memory sizes increase, cache structures tend to be more vulnerable to soft errors (SER) and detectable unrecoverable errors (DUE), due to the cache retaining modified data for a longer length of time. If a soft error corrupts a modified cache line, the line's data cannot be retrieved or correctly written back. First level cache is the largest contributor to the DUE FIT rate in a cache memory system. What is needed is a cache replacement policy that addresses reducing the residency time of dirty lines in a cache in order to achieve a reduced DUE FIT rate.

DESCRIPTION OF EMBODIMENTS

At least one embodiment includes a processor including a core data cache and cache control logic to receive a hit/miss signal from the core cache and initiate a core cache eviction in response. The cache control logic may receive a read/write signal from a load store unit or address generation unit, and an eviction policy signal indicative of a detectable unrecoverable error failure in time (DUE FIT) rate of the core data cache. In at least one embodiment, the eviction policy signal influences the selection of a line to evict in response to a cache miss. Responsive to a relatively high DUE FIT rate, the eviction policy may be modified to encourage the eviction of modified lines from the cache. When DUE FIT rate is low, the eviction policy may be relaxed so that modified lines are effectively to remain in the cache longer. The eviction policy may be implemented in stages with an intermediate stage attempting to prevent an increase in the number of modified lines in the core data cache and an aggressive stage to decrease the number of modified lines.

In at least one embodiment, the processor includes age modification logic to influence the cache eviction policy to preferentially evict modified lines based at least in part on the current estimated DUE FIT rate. The cache replacement policy may include multiple levels of aggressiveness with respect to evicting modified data from the core data cache. In at least one embodiment, an aggressive eviction policy is employed when the DUE FIT rate exceeds a specified threshold. The aggressive policy preferentially evicts modified lines for all cache miss events. If the DUE FIT rate is below the first threshold, but exceeds a lower threshold, one embodiment triggers and intermediate eviction policy under which modified lines are preferentially evicted when a cache write miss occurs, but employs a preexisting eviction policy, including but not limited to a least recently used policy, a pseudo LRU policy, a least recently filled policy, and a pseudo least recently filled policy. If the DUE FIT rate is below both thresholds, a relaxed policy may be invoked under which the recency based eviction policy is unmodified.

In at least one embodiment, modified lines are preferentially evicted by age modification logic that appends one or more most significant bits to an age field or age attributed employed by the recency based eviction logic. In these embodiments, the age modification logic may force the age-appended bits to 1 under and aggressive policy for all modified lines, while asserting the age-appended bits for modified lines only in response to a write miss under the intermediate eviction policy. The intermediate eviction policy effectively ensures that the number of modified lines on average does not increase. The eviction policies, age modifications, and DUE FIT estimates may be made on a per-core basis in a multicore cache. In these embodiments, a first core may operate under a first eviction policy if its DUE FIT rate is low or its DUE FIT target is high, while another core operates under a more aggressive policy if its DUE FIT rate is high or its target is lower.

In at least one embodiment, a cache eviction method includes obtaining DUE FIT data indicative of a DUE FIT rate, comparing the DUE FIT rate to a first threshold, and responsive to the DUE FIT rate exceeding the first threshold, evicting modified lines preferentially in response to all cache miss events. In some embodiments, the DUE FIT rate not exceeding the first threshold, but exceeding a second threshold, evicting modified lines in response to write miss events and evicting based on a recency policy otherwise. In one embodiment, a relaxed eviction policy, wherein lines are evicted based on a recency policy in response to cache miss events is set in response to the DUE FIT rate not exceeding the second threshold. further comprising, estimating the DUE FIT RATE based on an estimate of the number of modified lines.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus widget 12-1 refers to an instance of a widget class, which may be referred to collectively as widgets 12 and any one of which may be referred to generically as a widget 12.

Figure 1:
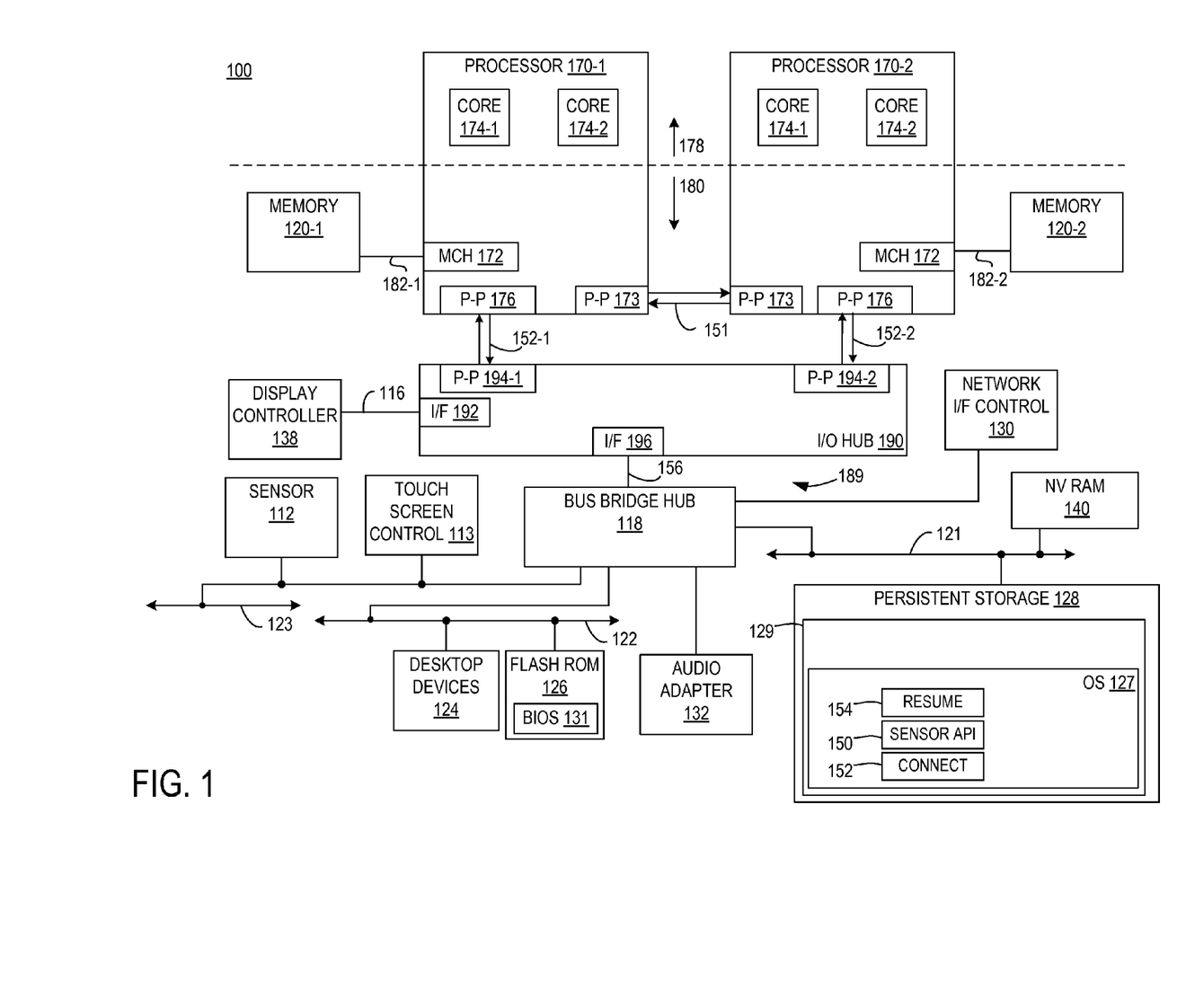
FIG. 1 illustrates a multiprocessor system used in conjunction with at least one embodiment.

Embodiments may be implemented in many different system types and platforms. FIG. 1 illustrates a multi-core processor used in conjunction with at least one embodiment. In at least one embodiment, system 100 includes a multi-processor system that includes a first processor 170-1 and a second processor 170-2. While some embodiments, include two processors 170, other embodiments may include more or fewer processors. In at least one embodiment, each processor 170 includes a core region 178 and an uncore region 180. In some embodiments, core region 178 includes one or more processing cores 174. In at least one embodiment, uncore region 180 includes a memory controller hub (MCH) 172, a processor-hub point-to-point interface 176, and a processor-processor point-to-point interface 173.

In at least one embodiment, MCH 172 supports bidirectional transfer of data between a processor 170 and a system memory 120 via a memory interconnect 182. In some embodiments, system memory 120 may be a double-data rate (DDR) type dynamic random-access memory (DRAM) while memory interconnect 182 and MCH 172 may comply with a DDR interface specification. In at least one embodiment, system memory 120-1 may include a bank of memory interfaces populated with corresponding memory devices or boards.

In at least one embodiment, system 100 is a distributed memory embodiment in which each processor 170 communicates with a local portion of system memory 120. In some embodiments, system memory 120-1 is local to processor 170-1 and represents a portion of the system memory 120 as a whole, which is a shared memory space. In some embodiments, each processor 170 can access each portion of system memory 120, whether local or not. While local accesses may have lower latency, accesses to non-local portions of system memory 120 are permitted in some embodiments.

In some embodiments, each processor 170 also includes a point-to-point interface 173 that supports communication of information with a point-to-point interface 173 of one of the other processors 170 via an inter-processor point-to-point interconnection 151. In some embodiments, processor-hub point-to-point interconnections 152 and processor-processor point-to-point interconnections 151 are distinct instances of a common set of interconnections. In other embodiments, point-to-point interconnections 152 may differ from point-to-point interconnections 151.

In at least one embodiment, processors 170 include point-to-point interfaces 176 to communicate via point-to-point interconnections 152 with a point-to-point interface 194 of an I/O hub 190. In some embodiments, I/O hub 190 includes a graphics interface 192 to support bidirectional communication of data with a display controller 138 via a graphics interconnection 116, which may be implemented as a high speed serial bus, e.g., a peripheral components interface express (PCIe) bus, or another suitable bus.

In some embodiments, I/O hub 190 also communicates, via an interface 196 and a corresponding interconnection 156, with a bus bridge hub 118 that supports various bus protocols for different types of I/O devices or peripheral devices. In at least one embodiment, bus bridge hub 118 supports a network interface controller (NIC) 130 that implements a packet-switched network communication protocol (e.g., Gigabit Ethernet), a sound card or audio adapter 132, and a low bandwidth bus 122 (e.g., low pin count (LPC), I2C, Industry Standard Architecture (ISA)), to support legacy interfaces referred to herein as desktop devices 124 that might include interfaces for a keyboard, mouse, serial port, parallel port, and/or a removable media drive. In some embodiments, low bandwidth bus 122 further includes an interface for a nonvolatile memory (NVM) device such as flash read only memory (ROM) 126 that includes a basic I/O system (BIOS) 131. In at least one embodiment, system 100 also includes a peripheral bus 123 (e.g., USB, PCI, PCIe) to support various peripheral devices including, but not limited to, one or more sensors 112 and a touch screen controller 113.

In at least one embodiment, bus bridge hub 118 includes an interface to a storage protocol bus 121 (e.g., serial AT attachment (SATA), small computer system interface (SCSI)), to support persistent storage 128, including but not limited to magnetic core hard disk drives (HDD), and a solid state drive (SSD). In some embodiments, persistent storage 128 includes code 129 including processor-executable instructions that processor 170 may execute to perform various operations. In at least one embodiment, code 129 may include, but is not limited to, operating system (OS) code 127 and application program code. In some embodiments, system 100 also includes nonvolatile (NV) RAM 140, including but not limited to an SSD and a phase change RAM (PRAM).

Although specific instances of communication busses and transport protocols have been illustrated and described, other embodiments may employ different communication busses and different target devices. Similarly, although some embodiments include one or more processors 170 and a chipset 189 that includes an I/O hub 190 with an integrated graphics interface, and a bus bridge hub supporting other I/O interfaces, other embodiments may include MCH 172 integrated in I/O hub 190 and graphics interface 192 integrated in processor 170. In at least one embodiment that includes integrated MCH 172 and graphics interface 192 in processor 170, I/O hub 190 and bus bridge hub 118 may be integrated into a single-piece chipset 189.

In some embodiments, persistent storage 128 includes code 129 executable by processor 170 to perform operations. In at least one embodiment, code 129 includes code for an OS 127. In at least one embodiment, OS 127 includes a core performance scalability algorithm and an uncore performance scalability algorithm to determine or estimate a performance scalability of processor 170. In some embodiments, OS 127 also includes core power scalability algorithm and uncore power scalability algorithm to determine or estimate a power scalability of processor 170.

In at least one embodiment, OS 127 also includes a sensor API 150, which provides application program access to one or more sensors 112. In at least one embodiment, sensors 112 include, but are not limited to, an accelerometer, a global positioning system (GPS) device, a gyrometer, an inclinometer, and an ambient light sensor. In some embodiments, OS 127 also includes a resume module 154 to reduce latency when transitioning system 100 from a power conservation state to an operating state. In at least one embodiment, resume module 154 may work in conjunction with NV RAM 140 to reduce the amount of storage required when system 100 enters a power conservation mode. Resume module 154 may, in one embodiment, flush standby and temporary memory pages before transitioning to a sleep mode. In some embodiments, by reducing the amount of system memory space that system 100 is required to preserve upon entering a low power state, resume module 154 beneficially reduces the amount of time required to perform the transition from the low power state to an operating state.

In at least one embodiment, OS 127 also includes a connect module 152 to perform complementary functions for conserving power while reducing the amount of latency or delay associated with traditional "wake up" sequences. In some embodiments, connect module 152 may periodically update certain "dynamic" applications including, email and social network applications, so that, when system 100 wakes from a low power mode, the applications that are often most likely to require refreshing are up to date.

Figure 2A:
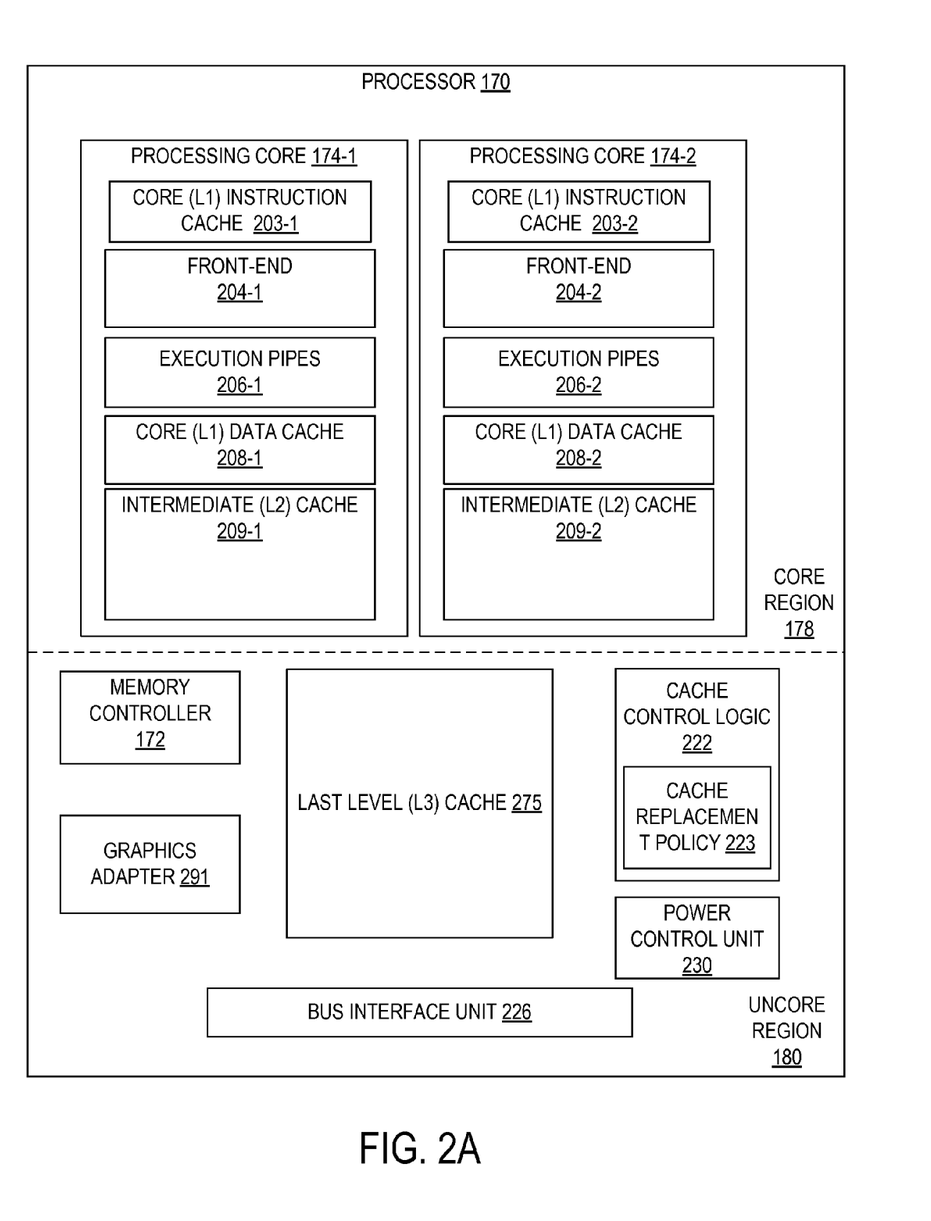
FIG. 2A illustrates a multi-core processor used in conjunction with at least one embodiment.

FIG. 2A illustrates a processor used in conjunction with at least one embodiment. In at least one embodiment, processor 170 includes a core region 178 and an uncore region 180. In some embodiments, core region 178 includes processing cores 174-1 and 174-2. Other embodiments of processor 170 may include more or fewer processing cores 174.

In some embodiments, each processing core 174 includes a core or level 1 (L1) instruction cache 203, a front-end 204, execution pipes 206, a core or L1 data cache 208, and an intermediate or level 2 (L2) cache 209. In at least one embodiment, front-end 204 receives or generates program flow information including an instruction pointer and branch predictions, fetches or prefetches instructions from core instruction cache 203 based on the program flow information it receives, and issues instructions to execution pipes 206. In some embodiments, front-end 204 may also perform instruction decoding to identify operation codes, identify source and destination registers, and identify any memory references. In at least one embodiment, execution pipes 206 may include multiple parallel execution pipelines including one or more floating point pipelines, one or more integer arithmetic logic unit pipelines, one or more branch pipelines, and one or more memory access pipelines, also referred to herein as load/store pipelines. In some embodiments, execution pipes 206 may generate micro code to process the instructions from core instruction cache 203, route instructions through the appropriate execution pipeline, and store any results in destination registers. In some embodiments, execution pipes 206 may encompass a register file that may support features including register renaming, speculative execution, and out-of-order execution of instructions.

In at least one embodiment, uncore region 180 includes a last level (L3) cache (LLC) 275 and cache control logic 222. In this embodiment, LLC 275 is a shared resource for all of processing cores 174 of processor 170. In some embodiments, as suggested by its name, LLC 275 represents, from the perspective of processor 170, the last available hierarchical tier of cache memory. In at least one embodiment, if a memory access instruction that is presented to LLC 275 generates a cache miss, the requested data must be retrieved from system memory 120.

In some embodiments, processing core 174 and/or uncore region 180 may include one or more levels of a cache hierarchy between core caches 203, 208, intermediate cache 209, and LLC 275. In some embodiments, each of the cache memories of processing core 174 may have a unique architectural configuration. In at least one embodiment, core data cache 208, intermediate cache 209 and LLC 275 are multiple-way, set associative caches. In some embodiments, LLC 275 is inclusive with respect to intermediate cache 209 while, in other embodiments, LLC 275 may be exclusive or non-inclusive with respect to intermediate cache 209. Similarly, in some embodiments, intermediate cache 209 may be either inclusive or non-inclusive with respect to core data cache 208, core instruction cache 203, or both.

In at least one embodiment, cache control logic 222 controls access to the cache memories, enforces a coherency policy, implements a replacement policy, and monitors memory access requests from external agents, including but not limited to, other processors 170 or I/O devices. In at least one embodiment, LLC 275, intermediate cache 209, and core caches 203, 208 comply with the MESI protocol or a modified MESI protocol. The four states of the MESI protocol are described in Table 1.

TABLE 1

Description of Cacheline States in the MESI Protocol

| MESI State | Description |
| --- | --- |
| Modified | The cache line contains valid data that is modified from the system memory copy of the data. Also referred to as a 'dirty' line. |
| Exclusive | The line contains valid data that is the same as the system memory copy of the data. Also indicates that no other cache has a line allocated to this same system memory address. Also referred to as a 'clean' line. |
| Shared | The line contains valid and clean data, but one or more other caches have a line allocated to this same system memory address. |
| Invalid | The line is not currently allocated and is available for storing a new entry. |

In some embodiments, the cache memories of processor 170 may implement a modified MESI protocol, which might include, in one embodiment, an "F" state identifying one of a plurality of "S" state lines, where the "F" state line is designated as the line to forward the applicable data should an additional request for the data be received from a processor that does not have the data.

In at least one embodiment, uncore region 180 of processor 170 also includes power control unit 230 to control power provided to the various resources of processor 170. In some embodiments, power control unit 230 provides unique power supply levels to core region 178 and uncore region 180. In other embodiments, power control unit 230 may be further operable to provide unique power supply levels to each processing core 174 and/or provide clock signals at unique frequencies to processing cores 174. In addition, in some embodiments, power management unit 230 may implement various power states for processor 170 and define or respond to events that produce power state transitions.

In some embodiments, uncore region 180 includes graphics adapter 291 to support low latency, high bandwidth communication with a display device (not depicted). In some embodiments, the integration of graphics adapter 291 into processor 170 represents an alternative embodiment, in which graphics interface 192 is implemented in the I/O hub 190.

In at least one embodiment, uncore region 180 includes a bus interface unit 226 to support communication with one or more chipset devices, discreet bus interfaces, and/or individual I/O devices. In some embodiments, bus interface unit 226 provides one or more point-to-point interfaces such as the interfaces 176 and 173. In other embodiments, bus interface unit 226 may provide an interface to a shared bus to which one or more other processors 170 may also connect.

Figure 2B:
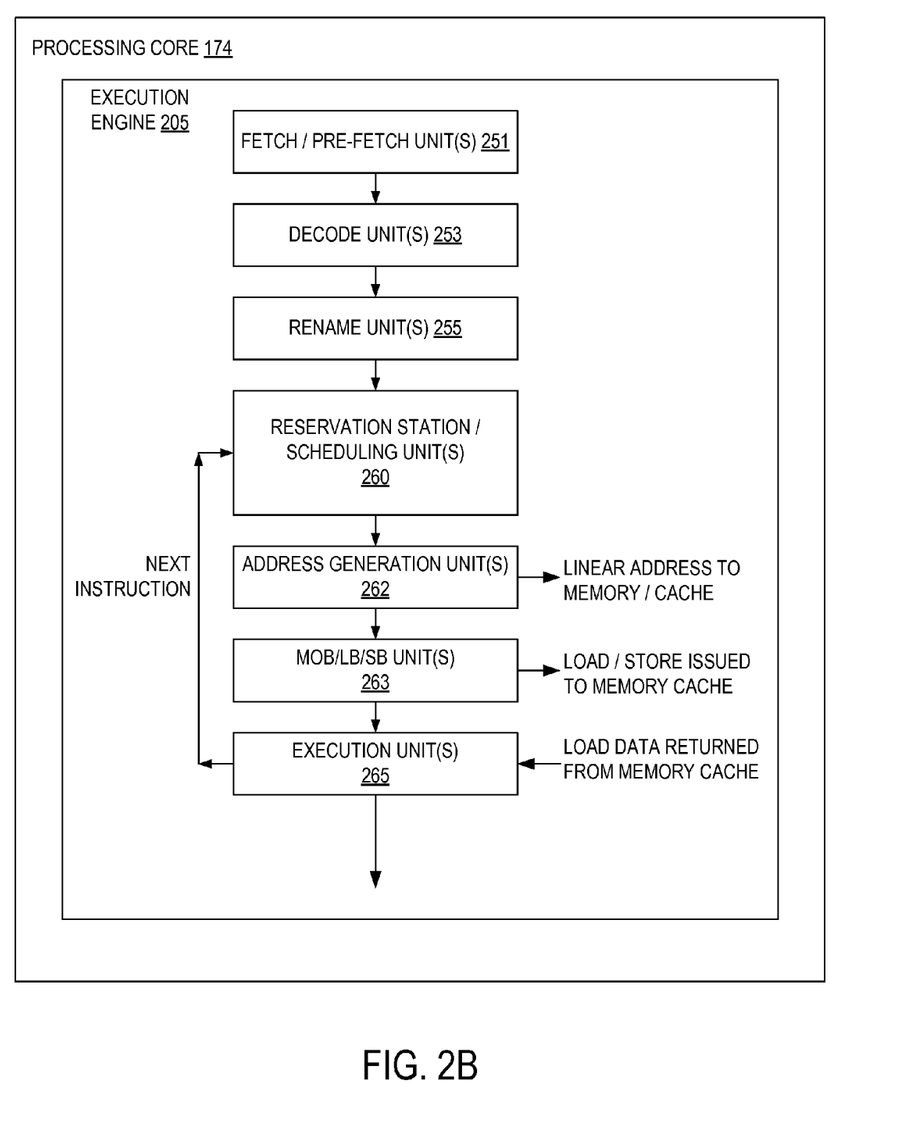
FIG. 2B illustrates a multi-core processor used in conjunction with at least one embodiment.

FIG. 2B illustrates an out-of-order execution core. In one embodiment, execution core 205 includes all or some of the elements of front end 204 and execution engine 206 of processing core 174. In at least one embodiment, pending loads may be speculatively issued to a memory address before other older pending store operations according to a prediction algorithm, such as a hashing function. In at least one embodiment, execution core 205 includes a fetch/prefetch unit 251, a decoder unit 253, one or more rename units 255 to assign registers to appropriate instructions or micro-ops, and one or more scheduling/reservation station units 260 to store micro-ops corresponding to load and store operations (e.g., STA micro-ops) until their corresponding target addresses source operands are determined. In some embodiments an address generation unit 262 to generate the target linear addresses corresponding to the load and stores, and an execution unit 265 to generate a pointer to the next operation to be dispatched from the scheduler/reservation stations 260 based on load data returned by dispatching load operations to memory/cache are also included. In at least one embodiment, a memory order buffer (MOB) 263, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores. In other embodiments, processor 170 is an in-order processor.

Figure 3:
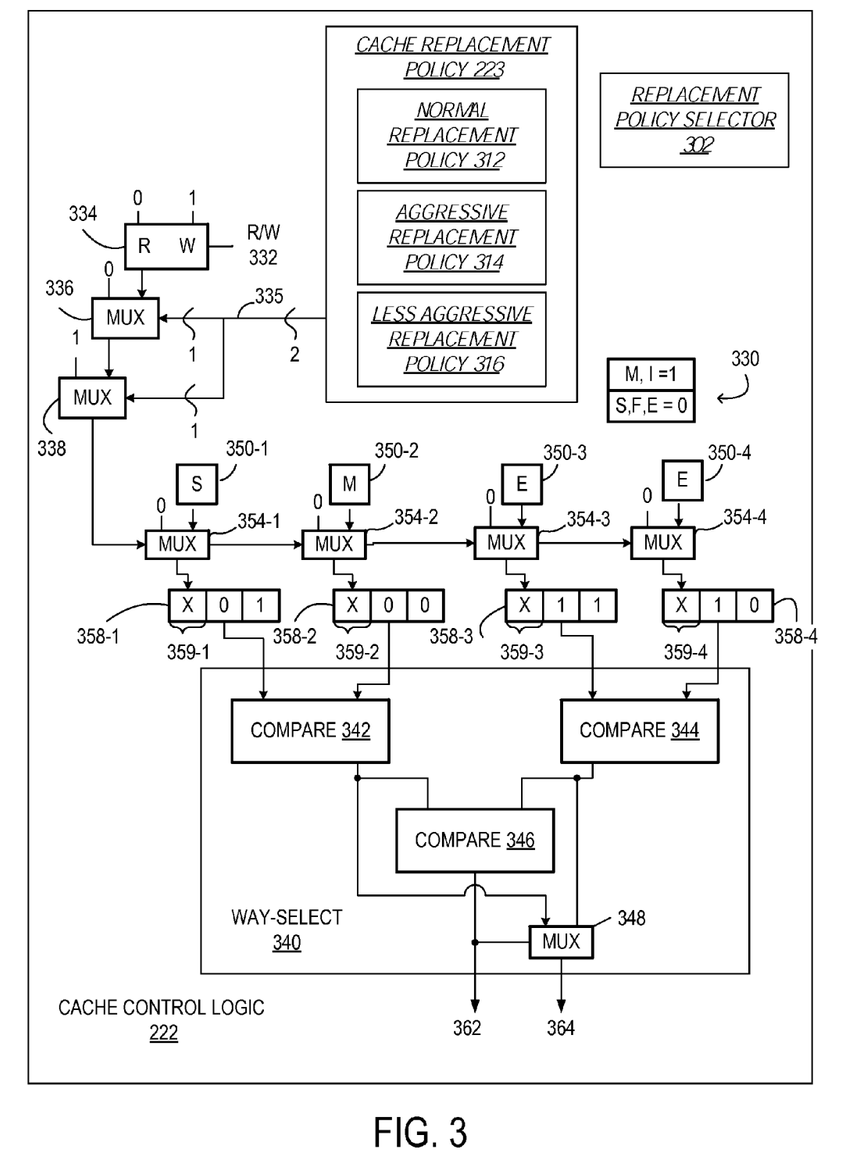
FIG. 3 illustrates a cache controller used in conjunction with at least one embodiment.

Referring now to FIG. 3, an illustration of an embodiment of a cache control logic is illustrated. In at least one embodiment, cache control logic 222 is used to determine if a memory request is cacheable. In some embodiments, cache control logic 222 includes cache replacement policy 223 and a replacement policy selector (RPS) 302. In some embodiments, cache replacement policy 223 includes three different replacement policies: normal replacement policy 312, aggressive replacement policy 314 and less aggressive replacement policy 316. In some embodiments, aggressive replacement policy 314 enforces evictions to remove dirty lines in the cache for write and read misses while less aggressive replacement policy 316 enforces evictions to only remove dirty lines in the cache for write misses. In some embodiments, RPS 302 is checked for bits that are set to select the replacement policy and the selection 304 is sent to the cache replacement policy block 223. In at least ones embodiment, block 330 represents a key to a MESI protocol.

In at least ones embodiment, multiplexor 336 selects a signal based on the output of R/W selector block 334, where a selection is made of a read or write miss based on read/write signal 332, and on the cache replacement policy selection 223 made by RPS 302. In some embodiments, the selected signal from 336 is sent to multiplexor 338 where a signal selection is made based on the cache replacement policy selection 223 made by RPS 302 (shown as signal 335). In some embodiments, the selected signal from 338 is sent to multiplexor 354. When a replacement occurs, the MESI protocol and two additional bits are, in some embodiments, checked in blocks 350-1, 350-2, 350-3 and 350-4. In some embodiments, respective signals from 350-1, 350-2, 350-3 and 350-4 are sent to multiplexors 354-1, 354-2, 354-3, and 354-4. In some embodiments, the multiplexors based on the input signals selects a signal to be sent to 358-1, 358-2, 358-3 and 358-4 respectively and stores the information in bits 359-1, 359-2, 359-3 and 359-4 respectively.

In some embodiments, the way-select values are chosen in the following manner by the cache control logic 222. Way-select 340 uses comparator 342 to compare the values of 358-1 and 358-2 to select the larger value to send to comparator 346 and to multiplexor 348. While comparator 344 compares the values of 358-3 and 358-4 to select the larger value to send to comparator 346 and multiplexor 348. Comparator 346 compares the values from comparator 342 and 344 to select the larger value to result in a way value 362, while multiplexor 348 uses the outputs of comparator 342 and 344 and selects based on the way value output of comparator 346 a select value 364.

Figure 4:
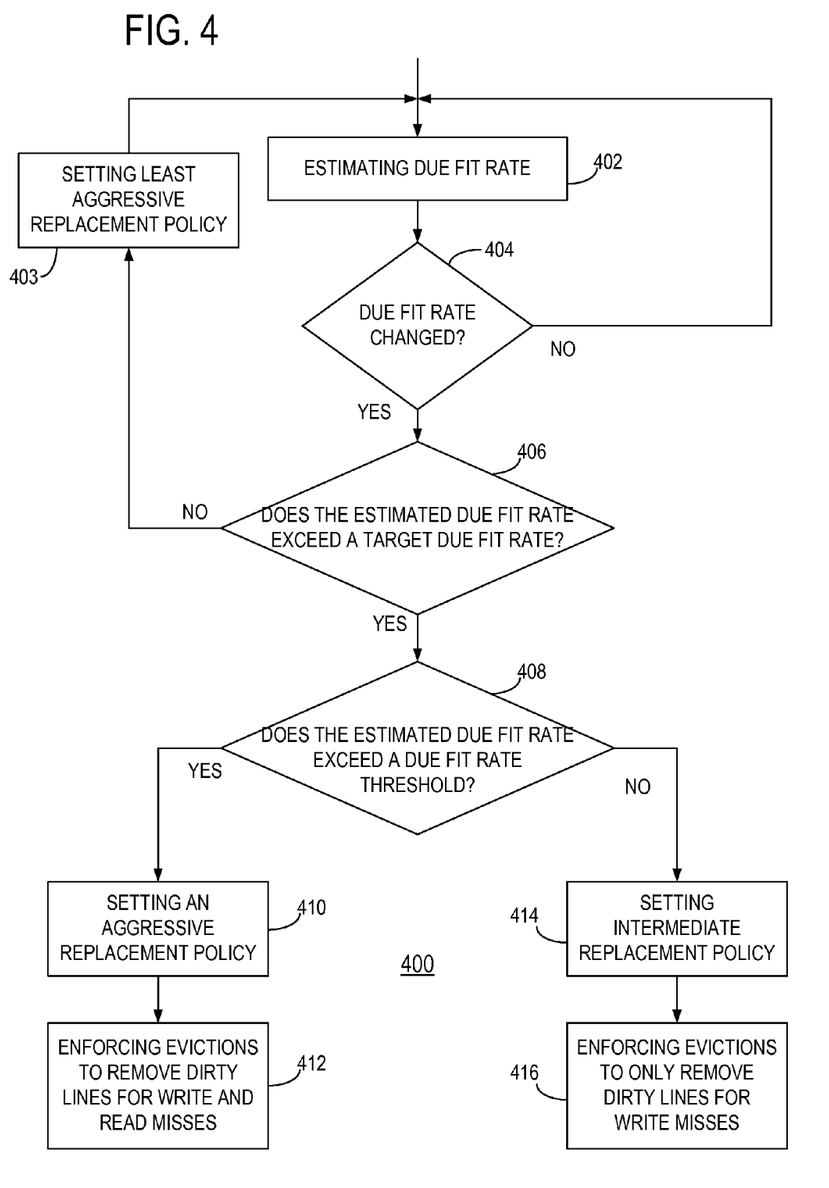
FIG. 4 illustrates one embodiment of a method of modifying an algorithm in order to reduce DUE FIT rate.

Referring now to FIG. 4, one embodiment of a method of modifying an algorithm in order to reduce a DUE FIT rate is illustrated. In some embodiments, a method begins with estimating a DUE FIT rate in block 402. In some embodiments, the estimated DUE FIT rate is tracked (block 404) and then a determination is made if the estimated DUE FIT rate exceeds a target DUE FIT rate in decision block 406. In some embodiments, if the estimated DUE FIT rate does not exceed the target DUE FIT rate, then the flow resumes tracking of the estimated DUE FIT rate (block 402), after setting a least aggressive replacement policy (block 403). In some embodiments, if the estimated DUE FIT rate does exceed the target DUE FIT rate, a determination must be made in decision block 408 if the estimated DUE FIT rate exceeds a DUE FIT rate threshold. In some embodiments, if the estimated DUE FIT rate exceeds the DUE FIT rate threshold, an aggressive replacement policy is set (block 410) and evictions are enforced to remove dirty lines in a cache for write and read misses (block 412). In some embodiments, if the estimated DUE FIT rate does not exceed the DUE FIT rate threshold in block 408, a less aggressive replacement policy is set (block 414) and evictions are enforced to only remove dirty lines in a cache for write misses (block 416).

Figure 5:
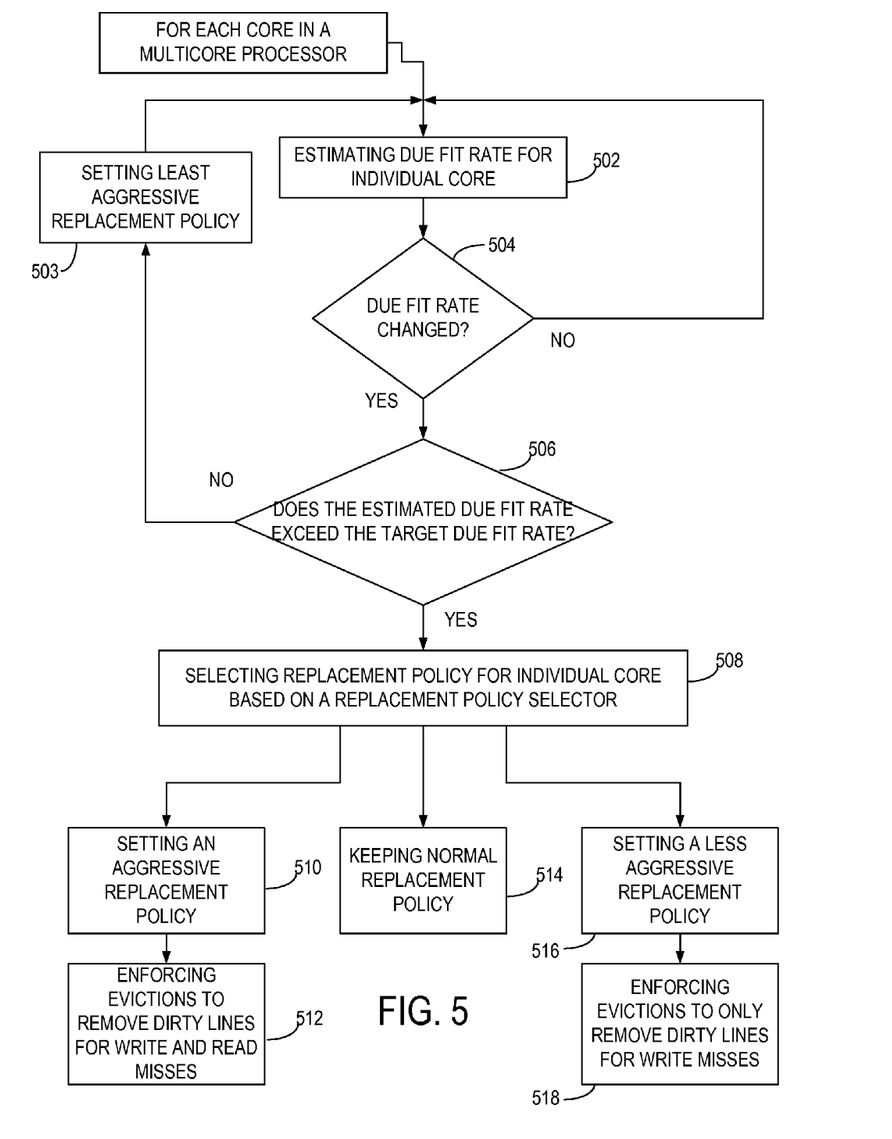
FIG. 5 illustrates one embodiment of a method of modifying an algorithm at core level to guarantee DUE FIT rate.

Referring now to FIG. 5, one embodiment of a method of modifying an algorithm at core level to guarantee a DUE FIT rate is illustrated. In at least one embodiment, a method emphasizes per core determinations of DUE FIT rate and maintaining per core eviction policies that are influenced by DUE FIT rates so that one core may be enforcing an aggressive eviction policy to reduce the number of modified lines while another core may be operating under a relaxed policy. In some embodiments, method 500 begins with estimating a DUE FIT rate in block 502. In some embodiments, the estimated DUE FIT rate is tracked (block 504) and then a determination is made if the estimated DUE FIT rate exceeds a target DUE FIT rate in decision block 506. In some embodiments, if the estimated DUE FIT rate does not exceed the target DUE FIT rate, then the flow resumes tracking of the estimated DUE FIT rate (block 502), after setting a least aggressive replacement policy (block 503). In some embodiments, if the estimated DUE FIT rate does exceed the target DUE FIT rate, a replacement policy is selected for each core using the RPS (block 508). Based on the replacement policy selection for each core, in some embodiments, either a normal replacement policy is implemented (block 514), an aggressive replacement policy is set (block 510) enforcing evictions to remove dirty lines from write and read misses (block 512), or a less aggressive replacement policy is set (block 516) enforcing evictions to only remove dirty lines for write misses (block 518). It is possible for all cores to select the same replacement policy or have each core select different replacement policies based on the particular application.

Figure 6:
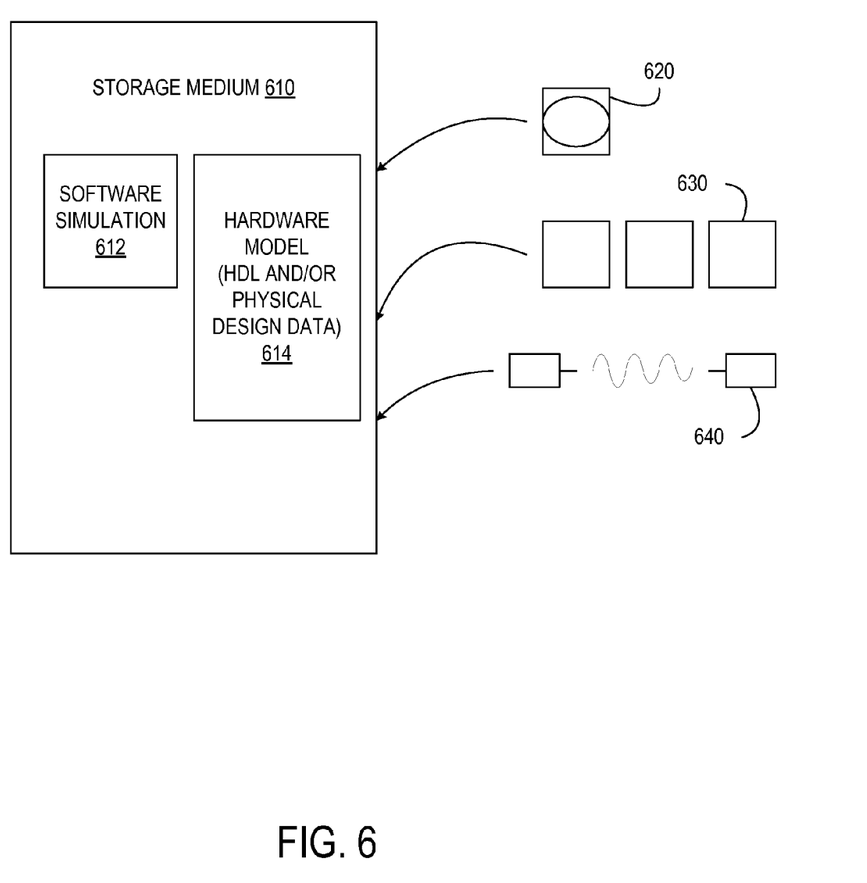
FIG. 6 illustrates a representation for simulation, emulation and fabrication of a design implementing the disclosed techniques.

Referring now to FIG. 6, a representation for simulation, emulation and fabrication of a design implementing the disclosed techniques is illustrated. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 614 may be stored in a storage medium 610 such as a computer memory so that the model may be simulated using simulation software 612 that applies a particular test suite to the hardware model 614 to determine if it indeed functions as intended. In some embodiments, the simulation software 612 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 640 modulated or otherwise generated to transmit such information, a memory 630, or a magnetic or optical storage 620 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments.

Embodiment 1 is a processor comprising: a core data cache; cache control logic to receive: a hit/miss from the core cache; a read/write signal from a load store unit; and an eviction policy signal indicative of a detectable unrecoverable error failure in time (DUE FIT) rate of the core data cache; age modification logic to: modify an age attribute of a modified cache line based on the read/write signal and the eviction policy signal.

In embodiment 2, the eviction policy signal included in the subject matter of embodiment 1 can optionally include an aggressive policy value, an intermediate policy value, and a relaxed policy value.

In embodiment 3, the age modification logic included in the subject matter of embodiment 1 can optionally increase the age attribute of all modified lines in the way responsive to assertion of the aggressive policy value.

In embodiment 4, the age modification logic included in the subject matter of embodiment 1 can optionally increase the age attribute of modified lines responsive to assertion of the intermediate policy value and the assertion of the write signal;

In embodiment 5, the subject matter of embodiment 1 can optionally include DUE FIT estimation logic to estimate the DUE FIT rate.

In embodiment 6, the DUE FIT estimation logic included in the subject matter of embodiment 5 can optionally estimate DUE FIT based on a number of modified lines in the core data cache.

In embodiment 7, the processor included in the subject matter of embodiment 1 can optionally include multiple processing cores and wherein each core includes the cache control logic and the age modification logic to influence eviction policy based on an estimate of the DUE FIT rate for the core.

Embodiment 8 is a cache eviction method comprising: obtaining DUE FIT data indicative of a DUE FIT rate; comparing the DUE FIT rate to a first threshold; responsive to the DUE FIT rate exceeding the first threshold, evicting modified lines preferentially in response to all cache miss events.

In embodiment 9, the subject matter of embodiment 8 can optionally include responsive to the DUE FIT rate not exceeding the first threshold but exceeding a second threshold, evicting modified lines in response to write miss events and evicting based on a recency policy otherwise.

In embodiment 10, the subject matter of embodiment 8 can optionally include responsive to the DUE FIT rate not exceeding the second threshold, setting a relaxed eviction policy wherein lines are evicted based on a recency policy in response to cache miss events.

In embodiment 11 the subject matter of embodiment 8 can optionally include the processor including a plurality of cores and the method includes performing for each core: the obtaining of DUE FIT data indicative of a DUE FIT rate; the comparing of the DUE FIT rate to a first threshold; and responsive to the DUE FIT rate exceeding the first threshold, the evicting of modified lines preferentially in response to all cache miss events.

In embodiment 12, the subject matter of embodiment 8 can optionally include estimating the DUE FIT RATE based on an estimate of the number of modified lines.

Embodiment 13 is a computer system comprising: a processor comprising: a core data cache; cache control logic to receive: a hit/miss from the core cache; a read/write signal from a load store unit; and an eviction policy signal indicative of a detectable unrecoverable error failure in time (DUE FIT) rate of the core data cache; age modification logic to: modify an age attribute of a modified cache line based on the read/write signal and the eviction policy signal.

In embodiment 14, the subject matter of embodiment 13 can optionally include wherein the eviction policy signal includes an aggressive policy value, an intermediate policy value, and a relaxed policy value.

In embodiment 15, the subject matter of embodiment 13 can optionally include wherein the age modification logic increases the age attribute of all modified lines in the way responsive to assertion of the aggressive policy value.

In embodiment 16, the subject matter of embodiment 13 can optionally include wherein the age modification logic increases the age attribute of modified lines responsive to assertion of the intermediate policy value and the assertion of the write signal;

In embodiment 17, the subject matter of embodiment 13 can optionally include wherein further comprising DUE FIT estimation logic to estimate the DUE FIT rate.

In embodiment 18, the subject matter of embodiment 17 can optionally include wherein the DUE FIT estimation logic estimates DUE FIT based on a number of modified lines in the core data cache.

In embodiment 19, the subject matter of embodiment 13 can optionally include wherein the processor includes multiple processing cores and wherein each core includes the cache control logic and the age modification logic to influence eviction policy based on an estimate of the DUE FIT rate for the core.

In embodiment 20, the subject matter of any one of embodiments 1-6 can optionally include wherein the processor includes multiple processing cores and wherein each core includes the cache control logic and the age modification logic to influence eviction policy based on an estimate of the DUE FIT rate for the core.

In embodiment 21, the subject matter of any one of embodiments 8-11 can optionally include estimating the DUE FIT RATE based on an estimate of the number of modified lines.

In embodiment 22, the subject matter of any one of embodiments 13-18 can optionally include wherein the processor includes multiple processing cores and wherein each core includes the cache control logic and the age modification logic to influence eviction policy based on an estimate of the DUE FIT rate for the core.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor comprising:
    a core data cache;
    cache control logic to receive:
        a hit/miss from the core data cache;
        a read/write signal from a load store unit; and
        an eviction policy signal indicative of a detectable unrecoverable error failure in time (DUE FIT) rate of the core data cache, the eviction policy signal including one of an aggressive policy value, an intermediate policy value, and a relaxed policy value; and age modification logic to:
        modify an age attribute of a modified cache line based on the read/write signal and the eviction policy signal, wherein the age modification logic is to increase the age attribute of modified lines in a way responsive to assertion of the aggressive policy value.

2. The processor of claim 1, wherein the age modification logic is to increase the age attribute of modified lines responsive to assertion of the intermediate policy value and assertion of the write signal.

3. The processor of claim 1, further comprising:
    DUE FIT estimation logic to estimate the DUE FIT rate.

4. The processor of claim 3, wherein the DUE FIT estimation logic is to estimate DUE FIT based on a number of modified lines in the core data cache.

5. The processor of claim 1, wherein the processor includes multiple processing cores and wherein each core includes the cache control logic and the age modification logic to influence eviction policy based on an estimate of the DUE FIT rate for the core.

6. A method, comprising:
    obtaining detectable unrecoverable error failure in time (DUE FIT) data indicative of a DUE FIT rate;
    comparing the DUE FIT rate to a first threshold; and
    responsive to the DUE FIT rate exceeding the first threshold, evicting modified lines stored in a cache memory of a processor preferentially in response to read and write cache miss events, evicting the modified cache lines preferentially in response to cache write miss events responsive to the DUE FIT rate not exceeding the first threshold and exceeding a second threshold, and evicting based on a recency policy in response to cache write miss events when the DUE FIT rate does not exceed the second threshold.

7. The method of claim 6, wherein responsive to the DUE FIT rate not exceeding the second threshold, setting a relaxed eviction policy wherein lines stored in the cache memory are evicted based on the recency policy in response to the read and write cache miss events.

8. The method of claim 6, wherein the processor includes a plurality of cores and the method includes performing for each core:
    the obtaining of DUE FIT data indicative of a DUE FIT rate;
    the comparing of the DUE FIT rate to a first threshold; and
    responsive to the DUE FIT rate exceeding the first threshold, the evicting of modified lines stored in the cache memory of the processor preferentially in response to the read and write cache miss events.

9. The method of claim 6, further comprising, estimating the DUE FIT rate based on an estimate of a number of modified lines stored in the cache memory.

10. A computer system, comprising:
    a processor comprising:
        a core data cache;
        cache control logic to receive:
            a hit/miss from the core data cache;
            a read/write signal from a load store unit; and
            an eviction policy signal indicative of a detectable unrecoverable error failure in time (DUE FIT) rate of the core data cache; and
        age modification logic to:
            modify an age attribute of a modified cache line based on the read/write signal and the eviction policy signal, to cause the modified cache line to be preferentially evicted in response to a cache miss event when the DUE FIT rate exceeds a first threshold, cause the modified cache line to be preferentially evicted in response to a cache write miss event when the DUE FIT rate is less than the first threshold and exceeds a second threshold, and not modify the age attribute of the modified cache line in response to a cache write miss event when the DUE FIT rate does not exceed the second threshold.

11. The computer system of claim 10, wherein the eviction policy signal includes an aggressive policy value, an intermediate policy value, and a relaxed policy value.

12. The computer system of claim 11, wherein the age modification logic is to increase the age attribute of modified lines in a way responsive to assertion of the aggressive policy value.

13. The computer system of claim 11, wherein the age modification logic is to increase the age attribute of modified lines in a way responsive to assertion of the intermediate policy value and assertion of the write signal.

14. The computer system of claim 10, further comprising DUE FIT estimation logic to estimate the DUE FIT rate.

15. The computer system of claim 14, wherein the DUE FIT estimation logic is to estimate the DUE FIT rate based on a number of modified lines in the core data cache.

16. The computer system of claim 10, wherein the processor includes multiple processing cores and wherein each core includes the cache control logic and the age modification logic to influence eviction policy based on an estimate of the DUE FIT rate for the core.

17. The processor of claim 1, wherein the age modification logic is to cause the modified cache line to be preferentially evicted in response to a cache miss event when the DUE FIT rate exceeds a first threshold, cause the modified cache line to be preferentially evicted in response to a cache write miss event when the DUE FIT rate is less than the first threshold and exceeds a second threshold, and not modify the age attribute of the modified cache line in response to a cache write miss event when the DUE FIT rate does not exceed the second threshold.

* * * * *